C. J. COLE.
ANIMAL HOLDING DEVICE.
APPLICATION FILED JUNE 5, 1914.
1,229,888.
Patented June 12, 1917.
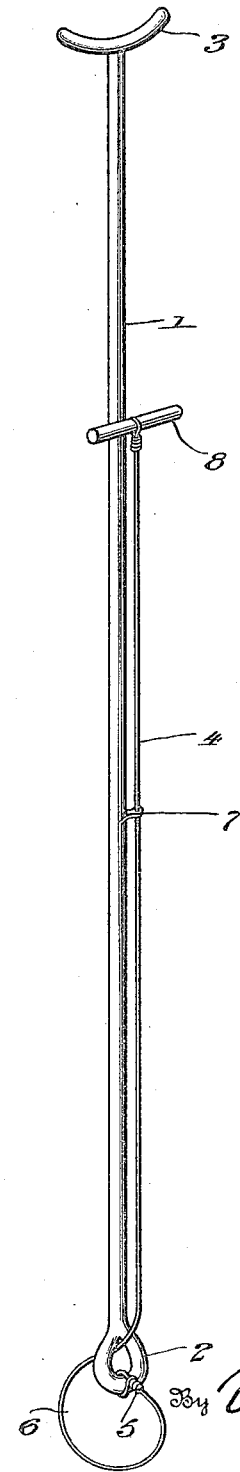
Witnesses:
Frederick R. Moran
J. W. Garner
Inventor
C. J. Cole,
By Victor J. Evans
Attorney

UNITED STATES PATENT OFFICE.

CHARLES J. COLE, OF SPRINGFIELD, ILLINOIS.

ANIMAL-HOLDING DEVICE.

1,229,888.  Specification of Letters Patent.  Patented June 12, 1917.

Application filed June 5, 1914. Serial No. 843,250.

*To all whom it may concern:*

Be it known that I, CHARLES J. COLE, a citizen of the United States, residing at Springfield, in the county of Sangamon and State of Illinois, have invented new and useful Improvements in Animal-Holding Devices, of which the following is a specification.

This invention is an improved device for holding an animal, such as a hog, while ringing, operating on or dosing the animal, the object of the invention being to provide an improved device of this character which is extremely cheap and simple, is very light and strong, and by means of which a person may hold an animal with one hand, leaving the other hand free to be used for ringing or treating the animal.

The invention consists in the construction, combination and arrangement of devices hereinafter described and claimed.

The accompanying drawing is a perspective view of an animal holding device constructed in accordance with my invention.

In the embodiment of my invention a stiff rod or staff 1 is provided which is preferably made of wrought iron and is formed at its lower end with an integral eye 2 whose axis is transverse to the length of the staff. At its upper end the staff is formed with a yoke 3 which is adapted to be placed under the arm of the user to constitute an arm rest.

A cord 4 is attached at one end as at 5 to the lower side of the eye, a loop or bight 6 is formed in the cord and disposed in a plane at right angles to that of the eye, and the upper side of the cord is then passed through the eye and extended up alongside the staff 1 and also passed through a guiding eye 7 with which the staff is provided. A cross rod 8 is supplied to form a handle, and is attached to the free end of the cord. In practice the cord is preferably a heavy copper wire of suitable gage and which is not liable to corrode.

To use the holder the bight or loop of the cord is slipped over the animal's snout or jaws, the arm rest 3 is placed under the arm and by grasping the handle 8 and pulling on the cord so as to tighten the bight around the jaws of the animal the animal can be very readily and securely held with one hand, leaving the other hand free for ringing the animal or otherwise treating him. Attention is directed to the fact that with the eye and the bight standing in planes at right angles to each other as described and shown, the cord easily passes through the upper side of the eye adjacent the staff and remote from the lower side of the eye to which its ends is attached at the point 5. Therefore when tension is applied to the cord with the bight around the snout of the animal, the cord slips through that part of the eye which is remote from the snout and the animal's flesh can not become entangled therewith and lacerated. In similar tools with which I am familiar, this objectionable feature is present. I avoid it by the construction described, and at the same time reduce the number of parts and therefore cheapen the cost of manufacture and simplify the operation. The disposition of the handle 8 beneath the arm rest 3 permits the latter to be placed in the arm pit while the operator's hand reaches down the staff and grasps the handle and draws it up to him in a manner which is entirely natural—thus making the operation of the tool easier than if he were required to hold the staff in one hand and push or pull on the handle with the other.

Having thus described the invention what is claimed is:—

The herein described animal holding device comprising a rigid staff having at its upper end an arm rest, at its lower end an integral eye whose axis is transverse to the length of the staff, and at its midlength a guide; a cord attached at one end to the lower side of the eye and formed into a bight standing in a plane at right angles to the plane of such eye, the cord passing from such bight through the upper side of the eye and leading thence up alongside the staff and through said guide; and a handle at the upper end of the cord below said arm rest.

In testimony whereof I affix my signature in presence of two witnesses.

CHARLES J. COLE.

Witnesses:
JOHN BURTON,
HENRY L. SMITH.

Copies of this patent may be obtained for five cents each, by addressing the "Commissioner of Patents, Washington, D. C."